United States Patent
Suntharalingam et al.

(10) Patent No.: US 9,421,855 B2
(45) Date of Patent: Aug. 23, 2016

(54) POWERTRAIN SYSTEM FOR HYBRID VEHICLES HAVING MULTIPLE MODES OF OPERATION

(71) Applicant: McMaster University, Hamilton (CA)

(72) Inventors: Piranavan Suntharalingam, Hamilton, CA (US); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 512 days.

(21) Appl. No.: 13/850,757

(22) Filed: Mar. 26, 2013

(65) Prior Publication Data

US 2013/0252773 A1    Sep. 26, 2013

Related U.S. Application Data

(60) Provisional application No. 61/615,663, filed on Mar. 26, 2012.

(51) Int. Cl.
| | | |
|---|---|---|
| *B60K 1/02* | (2006.01) | |
| *B60K 6/387* | (2007.10) | |
| *B60K 6/445* | (2007.10) | |
| *B60K 6/52* | (2007.10) | |
| *F16H 3/72* | (2006.01) | |
| *B60K 6/26* | (2007.10) | |
| *B60K 6/48* | (2007.10) | |

(52) U.S. Cl.
CPC ............. *B60K 6/387* (2013.01); *B60K 6/445* (2013.01); *B60K 6/52* (2013.01); *B60K 2006/266* (2013.01); *B60K 2006/4841* (2013.01); *F16H 3/727* (2013.01); *F16H 3/728* (2013.01); *Y02T 10/6239* (2013.01); *Y02T 10/6265* (2013.01); *Y10S 903/902* (2013.01)

(58) Field of Classification Search
CPC .................. B60K 2006/266; B60K 2006/204
See application file for complete search history.

(56) References Cited

U.S. PATENT DOCUMENTS

| | | |
|---|---|---|
| 4,405,029 A | 9/1983 | Hunt |
| 4,862,009 A | 8/1989 | King |
| 5,713,425 A | 2/1998 | Buschhaus et al. |
| 5,847,470 A | 12/1998 | Mitchell |
| 6,008,545 A | 12/1999 | Nagano et al. |
| 6,041,877 A | 3/2000 | Yamada et al. |
| 6,258,006 B1 | 7/2001 | Hanyu et al. |
| 6,319,168 B1 | 11/2001 | Morris et al. |
| 6,332,257 B1 | 12/2001 | Reed, Jr. et al. |
| 6,478,705 B1 | 11/2002 | Holmes et al. |
| 6,533,692 B1 | 3/2003 | Bowen |

(Continued)

*Primary Examiner* — Robert Hodge
*Assistant Examiner* — Ryan Dodd
(74) *Attorney, Agent, or Firm* — Bereskin & Parr LLP/S.E.N.C.R.L., s.r.l.

(57) ABSTRACT

A powertrain system for a vehicle is provided. The powertrain system includes an internal combustion engine, a first gearset connected to the internal combustion engine, a first electric machine connected to the first gearset, a drivetrain gear for connection to a drivetrain of the vehicle, a second gearset connecting the first gearset to the drivetrain gear, a second electric machine, and at least one dynamic clutch selectively coupling the second electric machine to the first electric machine, the first gearset, and the second gearset. In a first mode of operation, the at least one dynamic clutch couples the second electric machine and the first electric machine. In a second mode of operation, the at least one dynamic clutch couples the second electric machine and the first gearset. In a third mode of operation, the at least one dynamic clutch couples the second electric machine and the second gearset.

26 Claims, 6 Drawing Sheets

(56) References Cited

U.S. PATENT DOCUMENTS

| | | |
|---|---|---|
| 6,592,484 B1 | 7/2003 | Tsai et al. |
| 6,603,215 B2 | 8/2003 | Kuang et al. |
| 6,604,591 B2 | 8/2003 | Bowen et al. |
| 6,645,105 B2 | 11/2003 | Kima |
| 6,784,563 B2 | 8/2004 | Nada |
| 6,837,816 B2 | 1/2005 | Tsai et al. |
| RE41,034 E | 12/2009 | Lilley et al. |
| 7,918,756 B2 * | 4/2011 | Goldschmidt ............ B60K 6/26 475/151 |
| 8,011,461 B2 | 9/2011 | Rodriguez et al. |
| 2002/0082134 A1 | 6/2002 | Hirt et al. |
| 2009/0118955 A1 * | 5/2009 | Tabata ..................... B60K 6/40 701/66 |
| 2010/0000807 A1 | 1/2010 | Rodriguez et al. |
| 2013/0035186 A1 * | 2/2013 | Martin ................... B60K 6/547 475/5 |

* cited by examiner

POWERTRAIN SYSTEM FOR HYBRID VEHICLES HAVING MULTIPLE MODES OF OPERATION

CROSS-REFERENCE TO RELATED APPLICATION

This application claims the benefit of U.S. Provisional Application No. 61/615,663 filed Mar. 26, 2012, the entire contents of which are hereby incorporated herein by reference.

TECHNICAL FIELD

The present disclosure relates to powertrain systems for hybrid vehicles.

BACKGROUND

U.S. Pat. No. 6,258,006 describes a transmission including a first power transfer path for transferring an output of an engine to a vehicle driving shaft through a planetary gear connected to a motor, a second power transfer path for transferring the output of the engine to the vehicle driving shaft through gears and, and a power transfer switch which switches over the first and second power transfer paths from one to the other. In a hybrid vehicle wherein an engine, a motor and a generator are connected to a planetary gear, a follow-up loss caused by the generator is avoided in the case where the engine stops and the vehicle travels with the motor alone. In high-speed running, it is avoided that an electric energy for stopping the rotation of the generator is consumed. Further, torque assist by the generator is not restricted by constraints of the planetary gear.

U.S. Pat. No. 6,478,705 describes a hybrid electric powertrain including an electrically variable transmission having two differential gearsets coupled to an engine and first and second electrical machines, wherein the gearsets are configurable in input-split and compound-split modes, and wherein shifting between the input-split and compound-split modes occurs at a zero speed point of one of the electric machines for synchronous clutch engagement. The input-split mode provides reverse and low forward ranges, with the first machine operated as a motor and the second as a generator. The compound-split mode provides a high forward range, with the machines selectively operated in motoring or generating modes depending on the speed of the vehicle. Shifting between the input-split and compound-split modes occurs synchronously, and at a zero speed of the first machine, contributing to an exceptionally smooth shift.

U.S. Pat. No. 6,604,591 describes a drive axle adapted for use in hybrid vehicles and having an electric motor and a gearbox packaged within a common housing assembly. The gearbox includes a differential assembly driven by a planetary-type reduction unit. The reduction unit includes a first planetary gearset having a first sun gear driven by the motor, a first ring gear, and a set of first planet gears meshed with the first sun gear and the first ring gear. A first planet carrier is non-rotatably fixed to a stationary number and rotatably supports the first planet gears. A second planet gearset includes a second sun gear fixed for rotation with the first ring gear, a second ring gear non-rotatably fixed to the stationary member, and a set of second planet gears rotatably supported from a second planet carrier and which mesh with the second sun gear and the second ring gear.

U.S. Pat. No. 6,837,816 describes a motor-integrated transmission mechanism for use in parallel hybrid electric vehicles. The transmission can provide five basic modes of operation that can be further classified into sixteen sub-modes: one electric motor mode, four engine modes, four engine/charge modes, three power modes and four regenerative braking modes. Each of these sub-modes can be grouped into like clutching conditions, providing the functional appearance of a conventional 4-speed automatic transmission, with electric launch, engine-only, engine/charge, power-assist, and regeneration capability. CVT capability is provided with one of the engine/charge modes. The transmission can be incorporated in front-wheel drive and in rear-wheel drive vehicles.

INTRODUCTION

The following paragraphs are intended to introduce the reader to the more detailed description that follows and not to define or limit the claimed subject matter.

According to an aspect of the present disclosure, a powertrain system for a vehicle is provided. The powertrain system includes an internal combustion engine, a first gearset connected to the internal combustion engine, a first electric machine connected to the first gearset, a drivetrain gear for connection to a drivetrain of the vehicle, a second gearset connecting the first gearset to the drivetrain gear, a second electric machine, and at least one dynamic clutch selectively coupling the second electric machine to the first electric machine, the first gearset, and the second gearset. In a first mode of operation, the at least one dynamic clutch couples the second electric machine and the first electric machine. In a second mode of operation, the at least one dynamic clutch couples the second electric machine and the first gearset. In a third mode of operation, the at least one dynamic clutch couples the second electric machine and the second gearset.

According to another aspect of the present invention, a vehicle is provided including an internal combustion engine, a first gearset connected to the internal combustion engine, a first electric machine connected to the first gearset, at least one drive axle, a second gearset connecting the first gearset to the at least one drive axle, a second electric machine, and at least one dynamic clutch selectively coupling the second electric machine to the first electric machine, the first gearset, and the second gearset. In a first mode of operation, the at least one dynamic clutch couples the second electric machine and the first electric machine. In a second mode of operation, the at least one dynamic clutch couples the second electric machine and the first gearset. In a third mode of operation, the at least one dynamic clutch couples the second electric machine and the second gearset.

In yet another aspect of the invention a powertrain system for a vehicle is provided. The powertrain system includes an internal combustion engine, a first gearset connected to the internal combustion engine, a first electric machine comprising a first rotor and a first stator, a shaft connecting the first electric machine to the first gearset, and defining a shaft axis, a drivetrain gear for connection to a drivetrain of the vehicle, a second gearset connecting the first gearset to the drivetrain gear, a second electric machine comprising a second rotor and second stator, and at least one dynamic clutch selectively coupling the second electric machine to the first electric machine, the first gearset, and the second gearset. The first and second electric machines are operable independently as an electric motor and electric generators, and the first rotor and stator are arranged concentrically about the shaft axis, and the second rotor and stator are arranged concentrically about the shaft axis.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods are described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
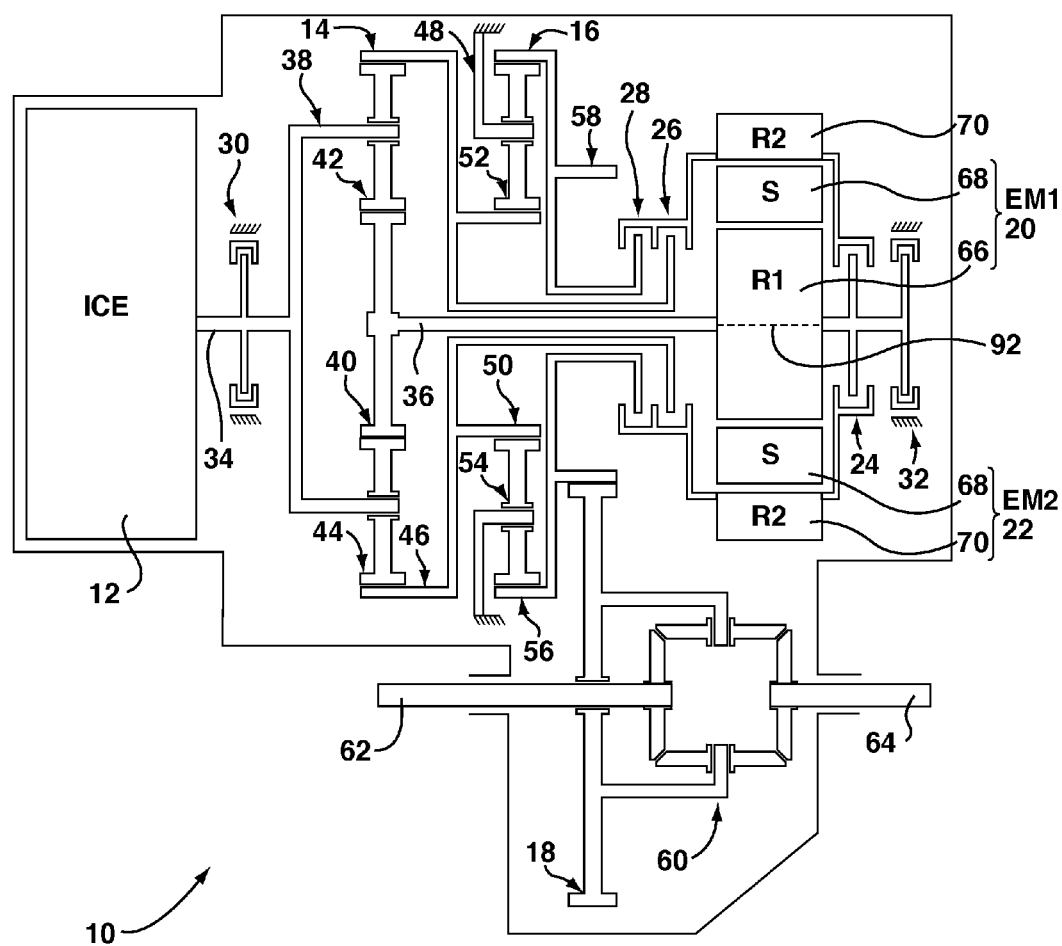
FIG. 1 is a schematic view of a powertrain system for a hybrid vehicle according to a first example.

Referring to FIG. 1, a powertrain system for a hybrid electric vehicle is shown generally at reference numeral 10. The powertrain system 10 includes an internal combustion engine 12, a first gearset 14 connected to the internal combustion engine 12, a second gearset 16 connected to the first gearset 14, a drivetrain gear 18 connected to the second gearset 16, and first and second electric machines 20, 22. In some examples, the first and second electric machines 20, 22 can be operated independently, and each as an electric motor and as an electric generator.

In the example illustrated, the powertrain system 10 includes dynamic clutches 24, 26, 28. The dynamic clutches 24, 26, 28 can each be selectively operated to achieve multiple modes of input from the second electric machine 22. In a first mode, the dynamic clutch 24 is engaged and each of the dynamic clutches 26, 28 is disengaged or released, and therefore the second electric machine 22 is connected with the first electric machine 20 so that the outputs are combined. During the first mode, the second electric machine 22 can act as a torque coupler to the powertrain system 10 for relatively low speed acceleration/driving conditions and/or relatively low speed regenerative braking conditions. In a second mode, the dynamic clutch 26 is engaged and each of the dynamic clutches 24, 28 is disengaged or released, and therefore the second electric machine 22 is connected with the first gearset 14. During the second mode, the second electric machine 22 can act as a torque coupler to the powertrain system 10 for medium speed acceleration/driving conditions and/or medium speed regenerative braking conditions. In a third mode, the dynamic clutch 28 is engaged and each of the dynamic clutches 24, 26 is disengaged or released, and therefore the second electric machine 22 is connected with the second gearset 16. During the third mode, the second electric machine 22 can act as a speed coupler to the powertrain system 10 for relatively high speed acceleration/driving conditions and/or relatively high speed regenerative braking conditions.

In some examples, the dynamic clutches 24, 26, 28 can be electro-mechanically actuated. In other examples, the dynamic clutches 24, 26, 28 can be hydraulically, mechanically and/or pneumatically actuated. In some examples, the powertrain system 10 can be configured so that only one of the dynamic clutches 24, 26 can be engaged at a time.

In the example illustrated, the powertrain system 10 includes static clutches 30, 32. The static clutch 30 can be integrated with a shaft 34 connecting the internal combustion engine 12 and the first gearset 14. The static clutch 32 can be integrated with a shaft 36 connecting the first electric machine 20 and the first gearset 14. Depending upon desired operating requirements of the powertrain system 10, the static clutches 30, 32 can be selectively operated to ground the internal combustion engine 12 and the first electric machine 20, respectively. In some examples, the static clutches 30, 32 can be electro-mechanically actuated. In other examples, the static clutches 30, 32 can be hydraulically, mechanically and/or pneumatically actuated.

In the example illustrated, the first gearset 16 takes the form of a planetary gearset, and includes a planetary carrier 38, a sun gear 40, pinion gears 42, 44, and a wheel gear 46. The planetary carrier 38 and the internal combustion engine 12 are connected by the shaft 34. The sun gear 40 and the first electric machine 20 are connected by the shaft 36, which extends lengthwise to define a shaft axis 92.

In the example illustrated, the second gearset 16 also takes the form of a planetary gearset, and includes a planetary carrier 48, a sun gear 50, pinion gears 52, 54, and a wheel gear 56. The wheel gear 46 is connected to the sun gear 50. The wheel gear 56 is connected with the drivetrain gear 18 via an output gear 58.

In the example illustrated, the powertrain system 10 includes a differential gearset 60, which includes the drivetrain gear 18, and first and second drive axles 62, 64 connected to the drivetrain gear 18. The first and second gearsets 14, 16 can be used to achieve different gearing ratios for different speed/torque requirements of the drive axles 62, 64, and to generally reduce stress on the power sources 12, 20, 22. In some examples, the first and second drive axles 62, 64 can be used to power front wheels of the vehicle. In some examples, the first and second drive axles 62, 64 can be used to power rear wheels of the vehicle.

In some examples, the clutches 24, 26, 28, 30, 32 can be incorporated in the powertrain system 10 to avoid idling of the first and second electric machines 20, 22, and to lock components. Although it can be possible to electrically lock the first and second electric machines 20, 22, depending on driving conditions a significant amount of electric energy can be required to achieve lock out. The clutches 24, 26, 28, 30, 32 can be used to help avoid this energy loss in the powertrain system 10. Furthermore, although the internal combustion engine 12 can be lockable, e.g., by controlling cylinder pressure, holding torque requirements can vary, e.g., depending upon the negative torque generated by the drive axles 54, 56. With the power rating of the internal combustion engine 12, the holding torque can vary and can affect acceleration and regenerative braking performance of the vehicle during electric mode operation. Therefore, to avoid performance deterioration, the static clutch 26 can be optionally incorporated with the powertrain system 10.

As mentioned above, the powertrain system 10 can achieve three modes of operation of the second electric machine 22. The three modes of operation can enhance kinetic energy recovery from regenerative braking for a wide range of vehicle speeds. For example, at relatively low speed braking conditions, the second electric machine 22 can be coupled with the drivetrain gear 18 of the differential gearset 60, via the first dynamic clutch 24, the shaft 36, the gearset 14, the gearset 16, and the output gear 58. At medium speed braking conditions, the second electric machine 22 can be coupled with the drivetrain gear 18 of the differential gearset 60, via the second dynamic clutch 26, the wheel gear 46 of the gearset 14, the gearset 16, and the output gear 58. At relatively high speed braking conditions, the second electric machine 22 can be coupled with the drivetrain gear 18 of the differential gearset 60, via the third dynamic clutch 28, the wheel gear 56 of the gearset 16, and the output gear 58. Therefore, a rotational speed of the second electric machine 22 can be maintained at relatively high levels for a wide range of vehicle speeds. Since the back electromotive force (EMF) of the second electric machine 22 can be generally proportional to the rotational speed, kinetic energy recovery can be effectively increased to enhance fuel economy of the powertrain system 10. Operating flexibility of the powertrain system 10 can also achieve improved acceleration performance.

As mentioned above, the first and second electric machines 20, 22 can be operated independently, which can significantly enhance reliability of the powertrain system 10 during failure of any of the power sources. For example, each of the first and second electric machines 20, 22 can be operated independently as a starter motor to start the internal combustion engine 12. Therefore, failure of the first electric machine 20 alone does not affect the starting mode of the internal combustion engine 12, as the second electric machine 20 can be used. Other power flow conditions can be achieved during failure of any of the power sources, to avoid breakdown. Having each of the power sources be operated independently can also minimize idling and extend operating life of components such as bearings.

In the example illustrated, the first electric machine 20 is formed by a first rotor 66 and a stator 68, and the second electric machine 22 is formed by a second rotor 70 and the stator 68. In operation, the first rotor 66 can rotate about the shaft axis 84 relative to the stator 68, and the second rotor 62 can rotate about the shaft axis 84 relative to the stator 60. Therefore, the first rotor 66, the stator 68 and the second rotor 70 can be arranged concentrically about the shaft axis 92, and the first and second electric machines 20, 22 can overlap in a direction parallel to the shaft axis 92. In this manner, the first and second electric machines 20, 22 can be arranged within a single envelop, which can reduce sizing requirements of the powertrain system 10.

Figures 3A, 3B, 3C:
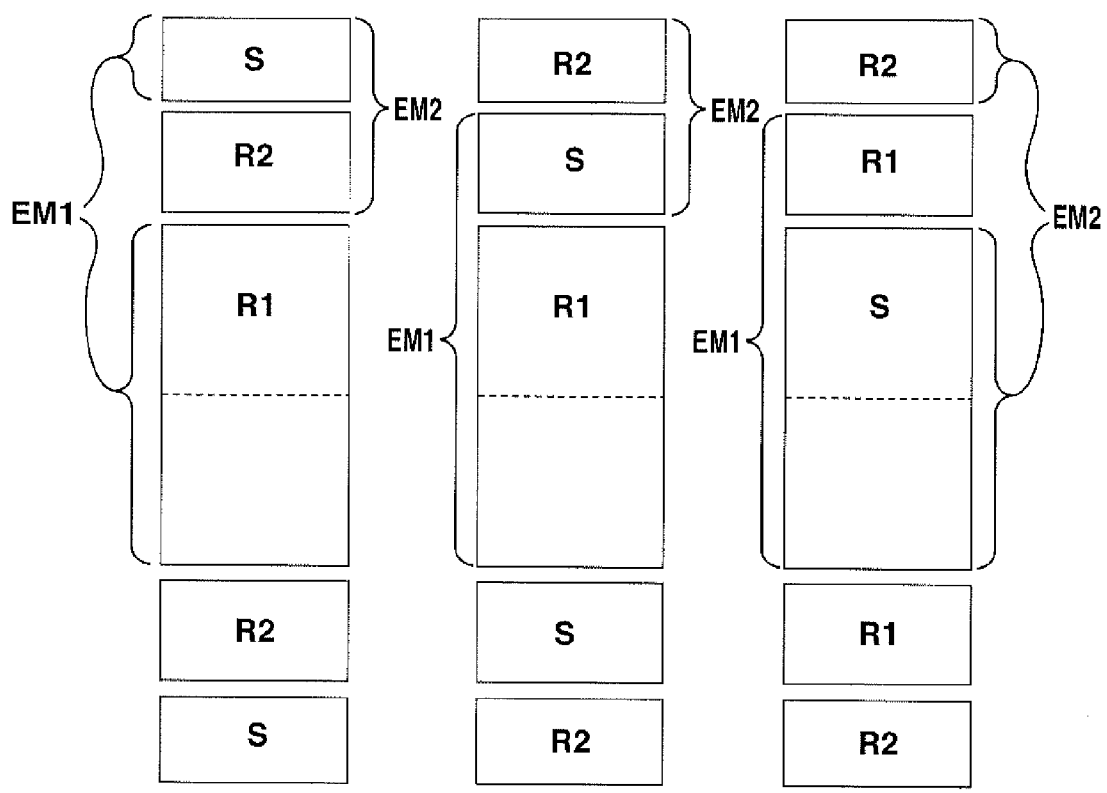
FIGS. 3A, 3B and 3C are schematic views of different configurations of exemplary electric machines.
Figures 4A, 4B, 4C, 4D:
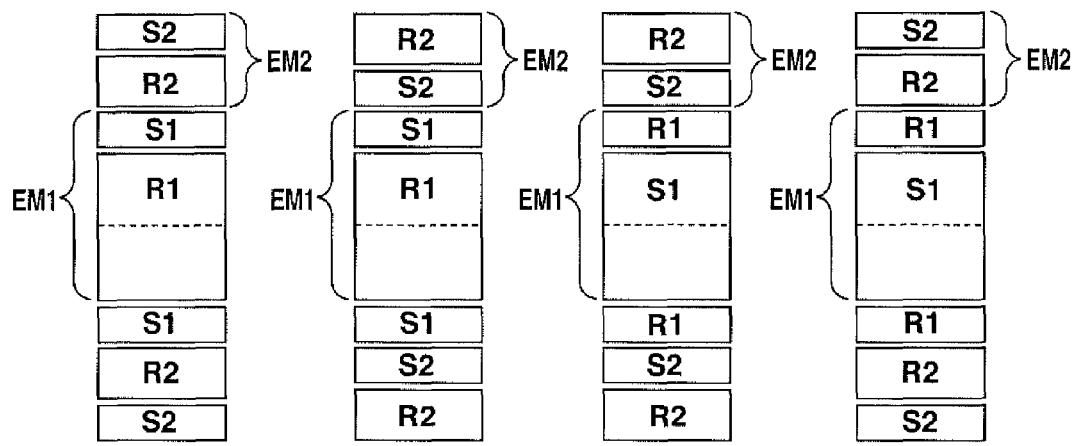
FIGS. 4A, 4B, 4C and 4D are schematic views of additional configurations of exemplary electric machines.

Referring now to FIGS. 3A, 3B and 3C, three alternative configurations of two electric machines are shown, each including two rotors and one stator. FIGS. 4A, 4B, 4C and 4D show four alternative configurations of two electric machines, each including two rotors and two stators. In each case, the components of the electric machines are arranged concentrically about a common axis, which is indicated by the broken line, and the electric machines overlap in a direction parallel to the axis. In various examples, the configurations illustrated FIGS. 3A, 3B, 3C, 4A, 4B, 4C and 4D can be implemented as the first and second electric machines 20, 22 of the powertrain system 10.

Figure 2:
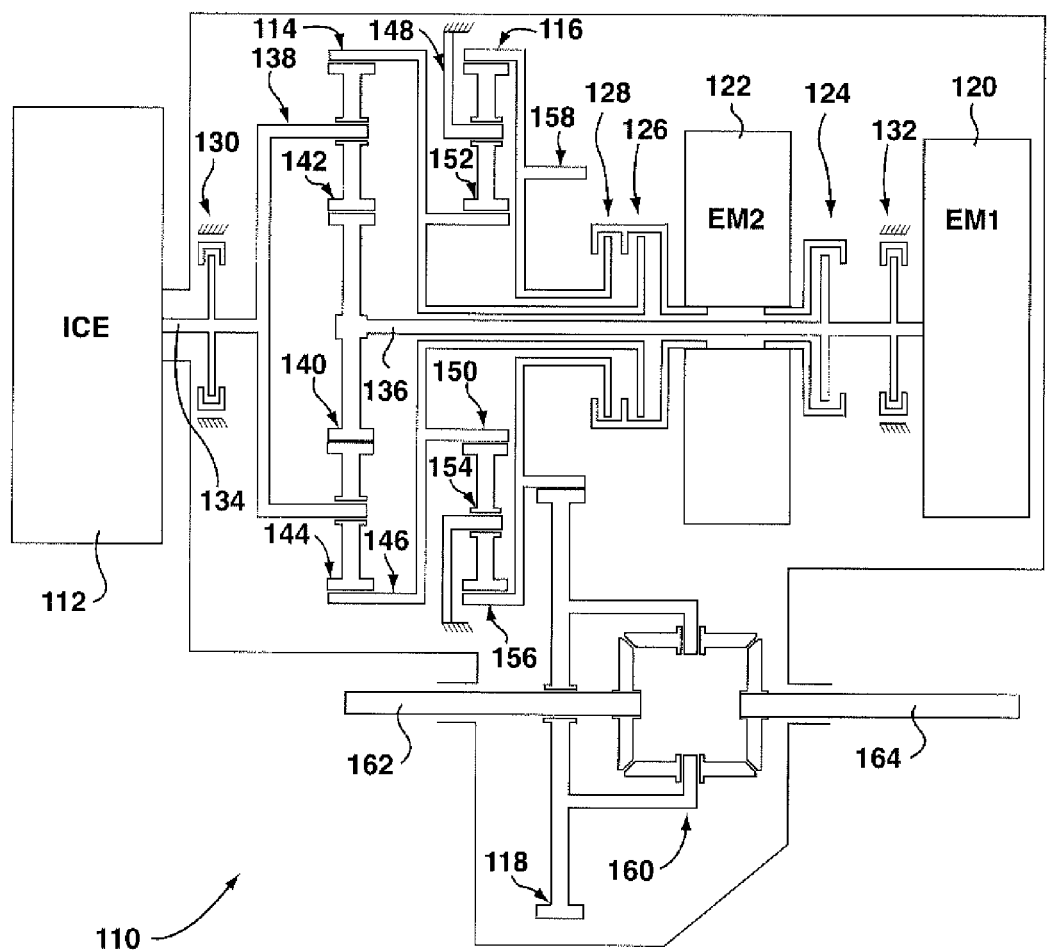
FIG. 2 is a schematic view of a powertrain system for a hybrid vehicle according to a second example.

Referring now to FIG. 2, a powertrain system 110 includes a first electric machine 120 and a second electric machine 122, which are illustrated as separate components. In various examples, the first and second electric machines 120, 122 can take the form of various types of electric machines, including: switch reluctance machines; induction machines; and/or permanent magnet machines. Operating principles and power flow patterns of the powertrain system 110 depicted in FIG. 2 can be generally similar to the powertrain system 10 depicted in FIG. 1, and the description of elements will not be repeated.

While FIGS. 1 and 2 shows the main mechanical components of the powertrain systems 10, 100, the powertrain systems 10, 100 can further include various electrical components that are not shown in FIGS. 1 and 2. For example, the powertrain system 10 can further include a battery, sensors, electrical connections, and one or more control units for controlling operation of the first and second electric machines 20, 22.

Referring back to FIG. 1, the clutches 24, 26, 28, 30, 32 can be selectively operated to deliver power to the drivetrain gear 18 and transfer tractive power to wheels of the vehicle. As mentioned above, the first, second and third modes of operation of the second electric machine 22 can significantly enhance operating performance of the powertrain system 10 by acting as a torque coupler during relatively low and medium speed operation, and as a speed coupler during relatively high speed operation. Furthermore, the powertrain system 10 can be flexible to operate in various different modes to achieve greater efficiency, including starting, conventional, series-parallel hybrid, parallel hybrid, and pure electric modes. Various operational modes and power flows are now described.

The powertrain system 10 can have two starting modes. In the first starting mode, the first electric machine 20 can be used to start the internal combustion engine 12. In this mode, the clutches 24, 30, 32 are released, and the first electric machine 20 can operate as a motor to supply power to the internal combustion engine 12 via the shaft 36 and the gearset 14. In the second starting mode, the second electric machine 22 can be used to start to the internal combustion engine 12. In this mode, the clutch 24 is engaged, the clutches 26, 28, 30, 32 are released, and the second electric machine 22 can operate as a motor to supply power to the internal combustion engine 12 via the shaft 36 and the gearset 14.

The powertrain system 10 can have a conventional mode. In this mode, the clutch 32 is engaged, and the clutches 26, 28, 30 are released. Power generated by the internal combustion engine 12 can be transferred to the drivetrain gear 18 via the gearsets 14, 16.

The powertrain system 10 can have two series-parallel hybrid modes, described as follows.

In the first series-parallel hybrid mode, the clutch 28 is engaged, the clutches 24, 26, 30, 32 are released, the first electric machine 20 can operate as a generator, and the second electric machine 22 can operate as a motor. A portion of power generated by the internal combustion engine 12 can be transferred to the first electric machine 20 via the shaft 36. Power generated by the first electric machine 20 can be transferred to the second electric machine 22. Power generated by the second electric machine 20 can be transferred to the drivetrain gear 18 via the output gear 58. The remainder of the power generated by the internal combustion engine 12 can be transferred to the drivetrain gear 18 via the gearsets 14, 16 and the output gear 58. In this mode, the second electric machine 22 is acting as a speed coupler.

In the second series-parallel hybrid mode, the clutch 26 is engaged, the clutches 24, 28, 30, 32 are released, the first electric machine 20 can operate as a generator, and the second electric machine 22 can operate as a motor. A portion of power generated by the internal combustion engine 12 can be transferred to the first electric machine 20 via the shaft 36. Power generated by the first electric machine 20 can be transferred to the second electric machine 22. Power generated by the second electric machine 20 can be transferred to the drivetrain gear 18 via the wheel gear 46, the gearset 16 and the output gear 58. The remainder of the power generated by the internal combustion engine 12 can be transferred to the drivetrain gear 18 via the gearsets 14, 16 and the output gear 58. In this mode, the second electric machine 22 is acting as a torque coupler.

The powertrain system 10 can have seven parallel hybrid modes, described as follows.

In the first parallel hybrid mode, the clutch 28 is engaged, the clutches 24, 26, 30, 32 are released, and the first and second electric machines 20, 22 can operate as motors. Power generated by the internal combustion engine 12 and the first and second electric machines 20, 22 can be transferred to the drivetrain gear 18, with the second electric machine 22 acting as a speed coupler.

In the second parallel hybrid mode, the clutch 26 is engaged, the clutches 24, 28, 30, 32 are released, and the first and second electric machines 20, 22 can operate as motors. Power generated by the internal combustion engine 12 and the first and second electric machines 20, 22 can be transferred to the drivetrain gear 18, with the second electric machine 22 acting as a torque coupler.

In the third parallel hybrid mode, the clutch 24 is engaged, the clutches 26, 28, 30, 32 are released, and the first and second electric machines 20, 22 can operate as motors. Power generated by the internal combustion engine 12 and the first and second electric machines 20, 22 can be transferred to the drivetrain gear 18, with the second electric machine 22 acting as a torque coupler.

In the fourth parallel hybrid mode, the clutch 24 is engaged, the clutches 26, 28, 30, 32 are released, and the second electric machine 22 can operate as a motor. Power generated by the internal combustion engine 12 and the second electric machine 22 can be transferred to the drivetrain gear 18, with the second electric machine 22 acting as a torque coupler.

In the fifth parallel hybrid mode, the clutches 28, 32 are engaged, and the clutches 24, 26, 30 are released, and the second electric machine 22 can operate as a motor. Power generated by the internal combustion engine 12 and the second electric machine 22 can be transferred to the drivetrain gear 18, with the second electric machine 22 acting as a speed coupler.

In the sixth parallel hybrid mode, the clutches 26, 32 are engaged, and the clutches 24, 28, 30 are released, and the second electric machine 22 can operate as a motor. Power generated by the internal combustion engine 12 and the second electric machine 22 can be transferred to the drivetrain gear 18, with the second electric machine 22 acting as a torque coupler.

In the seventh parallel hybrid mode, the clutches 24, 26, 28, 30, 32 are released, and the first electric machine 20 can operate as a motor. Power generated by the internal combustion engine 12 and the first electric machine 20 can be transferred to the drivetrain gear 18.

The powertrain system 10 can have seven electric modes, described as follows. In the description of the electric modes, the first electric machine 20 and/or the second electric machine 22 are operating as electric motors. There can be similar modes of operation for regenerative braking using the first and second electric machines 20, 22, in which the flow of power is generally in reverse.

In the first electric mode, the clutches 28, 30 are engaged, the clutches 24, 26, 32 are released, and the first and second electric machines 20, 22 can operate as motors. Power generated by the first and second electric machines 20, 22 can be transferred to the drivetrain gear 18, with the second electric machine 22 acting as a speed coupler.

In the second electric mode, the clutches 26, 30 are engaged, the clutches 24, 28, 32 are released, and the first and second electric machines 20, 22 can operate as motors. Power generated by the first and second electric machines 20, 22 can be transferred to the drivetrain gear 18, with the second electric machine 22 acting as a torque coupler.

In the third electric mode, the clutches 24, 30 are engaged, the clutches 26, 28, 32 are released, and the first and second electric machines 20, 22 can operate as motors. Power generated by the first and second electric machines 20, 22 can be transferred to the drivetrain gear 18, with the second electric machine 22 acting as a torque coupler.

In the fourth electric mode, the clutch 30 is engaged, the clutches 24, 26, 28, 32 are released, and the first electric machine 20 can operate as a motor. Power generated by the first electric machine 20 can be transferred to the drivetrain gear 18.

In the fifth electric mode, the clutches 28, 30 are engaged, the clutches 24, 26, 32 are released, and the second electric machine 22 can operate as a motor. Power generated by the second electric machine 22 can be transferred to the drivetrain gear 18, with the second electric machine 22 acting as a speed coupler.

In the sixth electric mode, the clutches 26, 30 are engaged, the clutches 24, 28, 32 are released, and the second electric machine 22 can operate as a motor. Power generated by the second electric machine 22 can be transferred to the drivetrain gear 18, with the second electric machine 22 acting as a torque coupler.

In the sixth electric mode, the clutches 24, 30 are engaged, the clutches 26, 28, 32 are released, and the second electric machine 22 can operate as a motor. Power generated by the second electric machine 22 can be transferred to the drivetrain gear 18, with the second electric machine 22 acting as a torque coupler.

The powertrain systems described herein can be implemented in various hybrid electric vehicles, including plug-in hybrid vehicles, and can be implemented in hybrid vehicles having front-wheel drive, rear-wheel drive, four-wheel drive and/or all-wheel drivetrain systems. Furthermore, the powertrain systems can be scalable, and therefore can be applicable to vehicles including small passenger car, minivans, sports utility vehicles, pickup trucks, vans, buses and trucks. Other applications can be possible, including off-road vehicles, tractors, mining and construction vehicles, hybrid boats and other naval applications.

Figure 5:
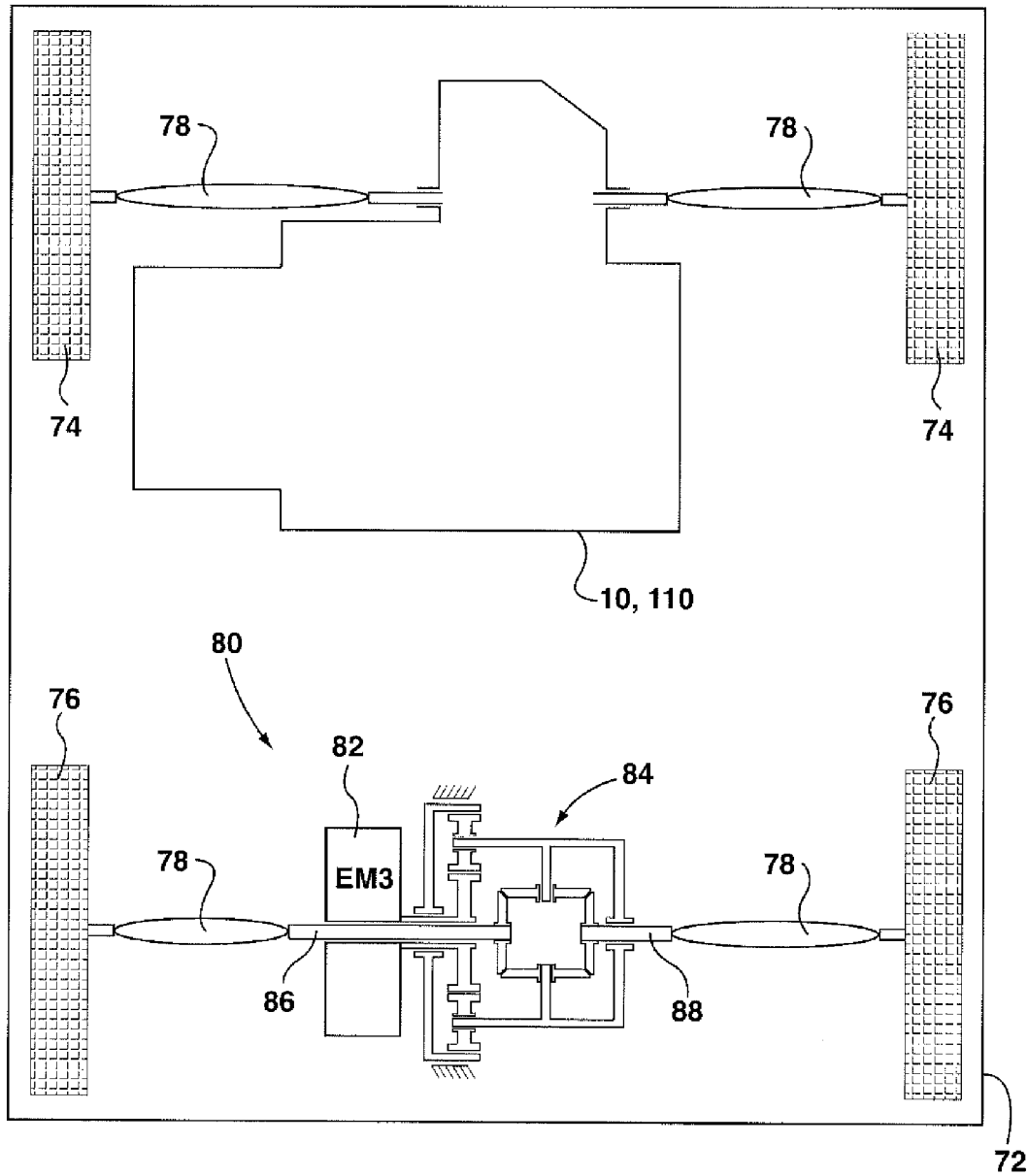
FIG. 5 is a schematic view of a vehicle including the powertrain systems of FIG. 1 or 2.

Referring now to FIG. 5, a vehicle 72 includes the powertrain system 10, 110, which is implemented as part of a four wheel drive or all-wheel drive system. The vehicle 72 includes front wheels 74 and rear wheels 76. In the example illustrated, the powertrain system 10, 110 is connected to the front wheels 74 by joints 78. The vehicle 72 includes a second powertrain system 80. The second powertrain system 80 is connected to the rear wheels 76 by joints 78. The second powertrain system 80 includes a third electric machine 82, a planetary gearset 84, and drive axles 86, 88. The planetary gearset 84 delivers power from the third electric machine 82 to the rear wheels 76.

Figure 6:
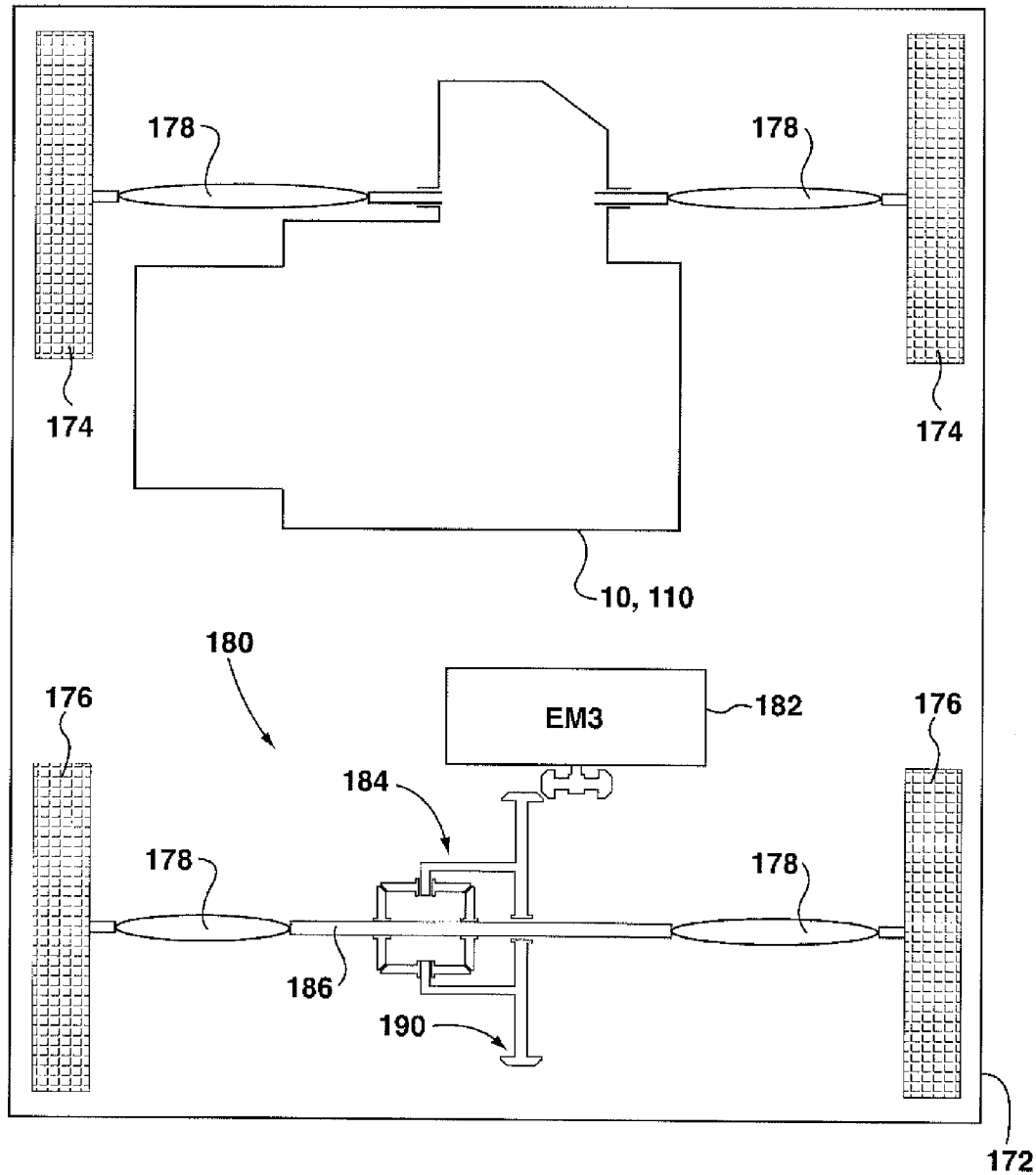
FIG. 6 is a schematic view of another vehicle including the powertrain systems of FIG. 1 or 2.

Similarly, FIG. 6 shows a vehicle 172 including the powertrain system 10, 110, also implemented as part of a four wheel drive or all-wheel drive system. In the example illustrated, a second powertrain system 180 includes a third electric machine 182, and a differential gearset 184 including a drive axle 186 and a ring gear 190. The differential gearset 184 delivers power from the third electric machine 182 to the rear wheels 176.

While the above description provides examples of one or more apparatuses or methods, it will be appreciated that other apparatuses or methods may be within the scope of the accompanying claims.

We claim:

1. A powertrain system for a vehicle, the powertrain system comprising:
    an internal combustion engine;
    a first gearset connected to the internal combustion engine;
    a first electric machine connected to the first gearset;
    a drivetrain gear for connection to a drivetrain of the vehicle;
    a second gearset connecting the first gearset to the drivetrain gear;
    a second electric machine;
    clutch connecting the second electric machine and the first electric machine;
    a second dynamic clutch connecting the second electric machine and the first gearset;
    and a third dynamic clutch connecting the second electric machine and the second gearset, and wherein: in a first mode of operation, the first dynamic clutch is engaged and the second and third dynamic clutches are released to couple the second electric machine and the first electric machine; in a second mode of operation, the second dynamic clutch is engaged and the first and third dynamic clutches are released to couple the second electric machine and the first gearset; and in a third mode of operation, the third dynamic clutch is engaged and the first and second dynamic clutches are released to couple the second electric machine and the second gearset.

2. The powertrain system of claim 1, wherein, in the first mode of operation, the first dynamic clutch connects the second electric machine to a shaft for transferring power from the first and second electric machines to the first gearset.

3. The powertrain system of claim 1, wherein, in the second mode of operation, the second dynamic clutch connects the second electric machine to a wheel gear of the first gearset for transferring power from the second electric machine to the first gearset.

4. The powertrain system of claim 1, wherein, in the third mode of operation, the third dynamic clutch connects the second electric machine to a wheel gear of the second gearset for transferring power from the second electric machine to the second gearset.

5. The powertrain system of claim 1, wherein the at least one dynamic clutch is electro-mechanically activated.

6. The powertrain system of claim 1, further comprising at least one static clutch for selectively grounding at least one of the internal combustion engine and the first electric machine.

7. The powertrain system of claim 6, wherein the at least one static clutch comprises a first static clutch integrated with a shaft connecting the first electric machine and the first gearset.

8. The powertrain system of claim 6, wherein the at least one static clutch comprises a second static clutch integrated with a shaft connecting the internal combustion engine and the first gearset.

9. The powertrain system of claim 6, wherein the at least one static clutch is electro-mechanically activated.

10. The powertrain system of claim 1, wherein the first and second electric machines are operable independently as an electric motor and an electric generator.

11. The powertrain system of claim 10, wherein the first electric machine comprises a first rotor and a first stator arranged generally concentrically about a shaft axis, and the second electric machine comprises a second rotor and a second stator arranged generally concentrically about the shaft axis.

12. The powertrain system of claim 11, wherein the first and second electric machines generally overlap in a direction parallel to the shaft axis.

13. The powertrain system of claim 11, wherein the first and second stators are the same component.

14. The powertrain system of claim 10, wherein the first and second electric machines are separate components.

15. The powertrain system of claim 1, wherein each of the first and second gearsets comprises a planetary gearset, and the drivetrain gear comprises a ring gear.

16. A vehicle comprising the powertrain system of claim 1.

17. The vehicle of claim 16, wherein the powertrain system transfers powers to a first set of wheels of the vehicle, and further comprising a third electric machine for powering a second set of wheels of the vehicle.

18. A vehicle, comprising:
    an internal combustion engine;
    a first gearset connected to the internal combustion engine;
    a first electric machine connected to the first gearset;
    at least one drive axle;
    a second gearset connecting the first gearset to the at least one drive axle;
    a second electric machine; a first dynamic clutch connecting the second electric machine and the first electric machine; a second dynamic clutch connecting the second electric machine and the first gearset; and a third dynamic clutch connecting the second electric machine and the second gearset,
    wherein, in a first mode of operation, the first dynamic clutch is engaged and the second and third dynamic clutches are released to couple the second electric machine and the first electric machine,
    wherein, in a second mode of operation, the second dynamic clutch is engaged and the first and third dynamic clutches are released to couple the second electric machine and the first gearset, and
    wherein, in a third mode of operation, the third dynamic clutch is engaged and the first and second dynamic clutches are released to couple the second electric machine and the second gears.

19. The powertrain system of claim 2, wherein, in the second mode of operation, the second dynamic clutch connects the second electric machine to a wheel gear of the first gearset for transferring power from the second electric machine to the first gearset.

20. The powertrain system of claim 19, wherein, in the third mode of operation, the third dynamic clutch connects the second electric machine to a wheel gear of the second gearset for transferring power from the second electric machine to the second gearset.

21. A powertrain system for a vehicle, the powertrain system comprising:
    an internal combustion engine;
    a first gearset connected to the internal combustion engine;
    a first electric machine connected to the first gearset;

a drivetrain gear for connection to a drivetrain of the vehicle;

a second gearset connecting the first gearset to the drivetrain gear;

a second electric machine; and a first dynamic clutch selectively connecting the second electric machine and the first electric machine;

a second dynamic clutch selectively connecting the second electric machine and the first gearset; and a third dynamic clutch selectively connecting the second electric machine and the second gearset, wherein, in a first mode of operation, the first dynamic clutch is engaged and the second and third dynamic clutches are released, wherein, in a second mode of operation, the second dynamic clutch is engaged and the first and third dynamic clutches are released, and wherein, in a third mode of operation, the third dynamic clutch is engaged and the first and second dynamic clutches are released.

22. The powertrain system of claim 21, wherein, in the first mode of operation, the first dynamic clutch connects the second electric machine to a shaft for transferring power from the first and second electric machines to the first gearset.

23. The powertrain system of claim 21, wherein, in the second mode of operation, the second dynamic clutch connects the second electric machine to a wheel gear of the first gearset for transferring power from the second electric machine to the first gearset.

24. The powertrain system of claim 21, wherein, in the third mode of operation, the third dynamic clutch connects the second electric machine to a wheel gear of the second gearset for transferring power from the second electric machine to the second gearset.

25. The powertrain system of claim 22, wherein, in the second mode of operation, the second dynamic clutch connects the second electric machine to a wheel gear of the first gearset for transferring power from the second electric machine to the first gearset.

26. The powertrain system of claim 25, wherein, in the third mode of operation, the third dynamic clutch connects the second electric machine to a wheel gear of the second gearset for transferring power from the second electric machine to the second gearset.

* * * * *